United States Patent [19]

McCoag

[11] 4,280,726

[45] Jul. 28, 1981

[54] KEYLESS LOCKABLE SECURITY DEVICES

[75] Inventor: John McCoag, Glasgow, Scotland

[73] Assignee: Aardee Spring & Lock Company Limited, Glasgow, Scotland

[21] Appl. No.: 39,415

[22] Filed: May 15, 1979

[30] Foreign Application Priority Data

May 17, 1978 [GB] United Kingdom .............. 20255/78

[51] Int. Cl.[3] ........................ E05C 13/02; F16B 19/00

[52] U.S. Cl. .................................... 292/327; 292/318; 292/324; 411/517

[58] Field of Search ............... 292/327, 324, 318, 319, 292/323, 307 R; 24/217 W, 218; 85/8.8, 5 B

[56] References Cited

U.S. PATENT DOCUMENTS

| | | | |
|---|---|---|---|
| 2,322,949 | 6/1943 | Lux | 85/8.8 |
| 2,615,735 | 10/1952 | Heimann et al. | 85/8.8 X |
| 3,486,286 | 12/1969 | Samaga | 85/8.8 X |
| 3,730,578 | 5/1973 | Gerlach | 292/318 |
| 3,812,756 | 5/1974 | Wenger | 85/8.8 |
| 3,937,507 | 2/1976 | McCoag | 292/319 |

FOREIGN PATENT DOCUMENTS

| | | | |
|---|---|---|---|
| 105999 | 11/1926 | Austria | 292/327 |
| 107771 | 1/1927 | Austria | 292/327 |
| 330460 | 12/1920 | Fed. Rep. of Germany | 292/327 |

*Primary Examiner*—William E. Lyddane

*Attorney, Agent, or Firm*—Krass, Young & Schivley

[57] ABSTRACT

Keyless lockable security devices in the form of a padlock or clevis pin for use in securing bulk containers in which the devices consist of a body member having at least one blind bore therein and a male member having limbs corresponding to the number of blind bores, insertable in the bore or bores.

Each of the bores and the limbs have an annular recessed portion of substantially crochet hook form and an annular member of spring steel split cross-sectionally in the form of a C-ring is located in the recessed portion of the body member.

The male limb is driven into the bore until its recessed portion is engaged by the annular member to prevent withdrawal of the limb from the bore.

The body member may have two parallel bores, the male member being in the form of a substantially U-shaped shackle with its limbs insertable in the respective bores and the free end surfaces of the limbs are provided with aligned slots into which is inserted a pin through a bore transverse to the blind bores to prevent rotation of the limbs if the limbs are separated from one another.

8 Claims, 6 Drawing Figures

KEYLESS LOCKABLE SECURITY DEVICES

This invention relates to keyless lockable security devices.

More specifically the invention provides for keyless lockable security devices which are in the form of a keyless padlock or sealing pin for use in securing bulk containers where a high degree of security is required.

In the transport of large consignments of goods, bulk containers are used which can be secured for transportation via road (TIR vehicles), rail, air or sea, and a high degree of security is necessary to ensure detection of unauthorised access to the containers, the doors of such containers are normally secured by use of a padlock or the like.

The present invention provides for keyless lockable security devices in the form of a keyless padlock or sealing pin which can be used to secure the door or doors of bulk containers and which have to be destroyed to gain access to the container.

According to the invention a keyless lockable security device comprises a body member having at least one blind bore therein, the or each bore having an annular recessed portion intermediate the ends of the bore, in cross-section the recessed portion has an inclined side surface extending from the bottom of the recess to one edge in the direction of the open end of the bore and the opposite side surface is concave from the bottom of the recess to the other edge, a male member having a limb or limbs corresponding in number to the number of blind bores insertable in its respective blind bores, the or each limb having an annular recessed portion adjacent a free end thereof in cross-section the second recessed portion of the limb has an inclined side surface extending from the bottom of the recess to one edge and an opposite concave side surface extending from the bottom of the recess to the other edge, an annular member of spring steel split cross-sectionally in the form of a C-ring is located in the annular recessed portion of its respective blind bore for engagement in the annular recessed portion of its associated limb when the limb is inserted into its respective blind bore to prevent withdrawal of the limb from the bore.

When the male member has more than one limb means may be provided for preventing rotation of the limbs relative to their respective bores if the limbs are separated.

Embodiments of the invention are illustrated by way of example in the accompanying drawings in which.

Figure 1:
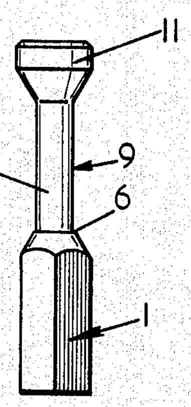
FIG. 1 is an elevational view of a keyless lockable security device according to one embodiment of the invention.
Figure 2:
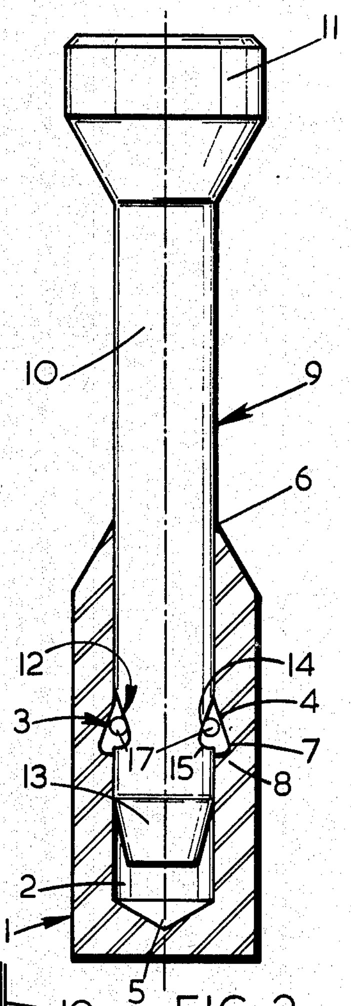
FIG. 2 is an enlarged cross-sectional view of the device of FIG. 1.
Figure 4:
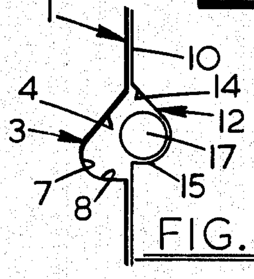
FIG. 4 is an enlarged cross-sectional view of one embodiment of the recessed portions in the limb and body member of the device of FIGS. 1 and 3.

Referring to FIGS. 1, 2 and 4 of the drawings, there is illustrated a keyless lockable security device according to one embodiment of the invention, which is in the form of a sealing pin, in which a body member, illustrated generally at 1 is provided with a longitudinal blind bore 2 in which an annular recessed portion 3 is formed intermediate the ends of the bore 2.

In cross-section, as shown in FIG. 4, the recessed portion 3 has an inclined surface 4 extending from the bottom 7 of the recess to one edge of the recess in the direction of the open end 6 of the bore and the other side surface 8 is arcuately formed from the bottom of the recess to the opposite edge of the recess.

A male member, indicated generally at 9, comprises a limb portion 10 having a head portion 11 at one end and an annular recessed portion 12 adjacent the opposite free end 13 of the limb which is insertable in the blind bore 2 of the body member.

The annular recessed portion 12 is illustrated more clearly in FIG. 4. In cross-section the recessed portion 12 is formed by a side surface 14 which is inclined from the bottom of the recess to one edge thereof in the direction of the head portion 11 and its opposite side surface 15 is arcuately formed from the bottom of the recess to the opposite edge of the recess.

An annular member 17 which is split cross-sectionally to form a C-ring is insertable in the annular recessed portion 3 of the body member and is so dimensioned radially that it fits snugly into the bottom of the recessed portion 12 in the limb when the limb is inserted into the blind bore 2. The C-ring is formed from hard drawn spring steel wire and prevents withdrawal of the limb from the blind bore. The recessed portions on the limb and in the bore are substantially mirror images and are aligned when the limb is inserted into the bore.

The relationship between the annular member 17, the recessed portion 3 and the recessed portion 12 when the limb of the male member is inserted into the blind bore 2 is such that at least 50% of the cross-sectional area of the annular member is located within the recessed portion 12 and the annular member is captured by the arcuate surface 15 which are substantially of equal radii.

Preferably 60% of the cross-sectional area of the annular member is captured in the recessed portion 12.

The male member when locked in the blind bore of the body member by the annular member is rotatable relative to the body member.

When in use the limb of the male member is inserted through the limbs of shackles or bores in brackets mounted on the door and wall or double doors of a bulk container.

The body member 1 is then applied to the male member and the limb 10 is driven into the blind bore 2 where it is locked against withdrawal by engagement of the annular member in the recessed portion 12.

The security device can only be removed or unlocked by destroying the limb of the male member as by cutting.

Figure 3:
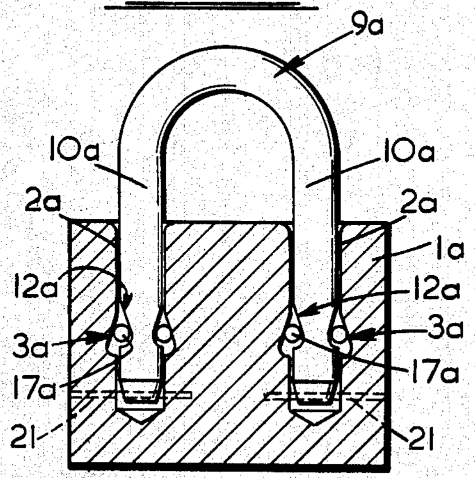
FIG. 3 is a cross-sectional view of another embodiment of a keyless lockable security device.

A further embodiment of a security device is illustrated in FIG. 3 of the drawing from which it will be seen that the device is in the form of a keyless padlock in which a body member 1*a* is provided with two parallel blind bores 2*a* each having an annular recessed portion 3*a* identical to the annular recessed portion 3 of the above described embodiment of FIG. 2.

A male member 9*a* which is generally in the form of a U-shaped shackle has two parallel limbs 10*a* each of which has an annular recessed portion 12*a* identical to the recessed portion 12.

The limbs 10*a* of the male member 9*a* are insertable in their respective blind bores in the body member where they are locked by annular members 17*a* in the form of C-rings identical to the member 17 of the embodiment of FIG. 2.

There is a danger that, when in use, if the shackle 9*a* is cut, the limbs 10*a* can be rotated relative to the body member thus allowing the security device to be removed and allowing unauthorised access to a container which it secures. The security device could be refitted to the container and the cut shackle welded to delay detection of its removal.

Figure 3A:
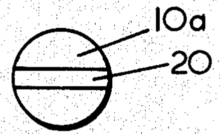
FIG. 3A is an end view of one of the limbs of the device of FIG. 3.

To prevent rotation of the shackle limbs 10*a* relative to the body member when the shackle is cut, the end surface of each limb 10*a* is provided with a transverse slot 20 (FIG. 3A) or aligned bores 21 transverse to the axis of the blind bores 2*a intersect each of the bores 2a* as shown in broken lines in FIG. 3.

A hardened steel blocking pin 22 is inserted in each of the bores 21 to register with the respective slot 20 in the ends of the limbs when the limbs are inserted in the bores 2*a.*

The bores 21 may be formed as a continuous blind bore through the body member and a single pin may be inserted through the bore 21 to register with the slots in the ends of the limbs.

Figure 5:
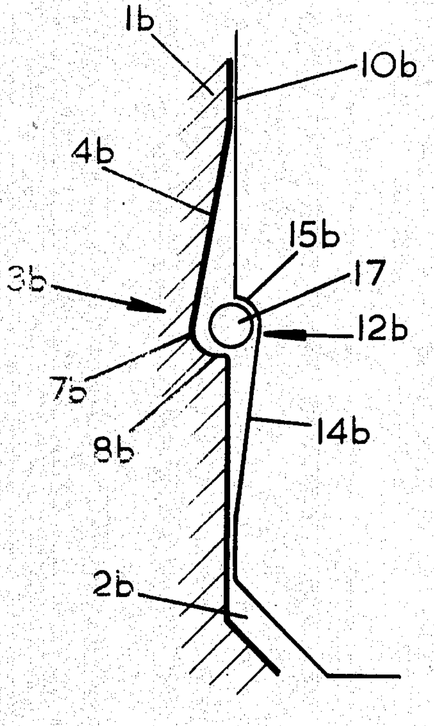
FIG. 5 is an enlarged cross-sectional view of an alternative embodiment of the recessed portions in the limb and body members of FIGS. 1 and 3.

An alternative arrangement of the annular recessed portion in the blind bores and the annular recessed portion in the limb or limbs of the male member of both of the above embodiments is illustrated in FIG. 5 of the drawings wherein in cross-section one side surface 4*b* of the recess 3*b* in the blind bore 2*b* is inclined from the bottom 7*b* of the recess and extends to the edge of the recess adjacent the open end of the blind bore 2*b* and the other side surface 8*b* of the recess is arcuate terminating at the opposite edge of the recess 3*b.* One side surface 14*b* of the annular groove 12*b* in the limb 10*b* of the male member is inclined from the bottom of the groove and extends to the edge of the recess 12*b* adjacent the free end of the limb 10*b* and the other side surface 15*b* is arcuate and terminates at the opposite edge of the groove.

When the limb or limbs of the male member is inserted into its respective blind bore and the annulus 17 is located between the annular recesses the limb is locked in the bore and cannot be withdrawn. The annulus is subject to compression stress as the limb is moved in an outward direction and no sheer action on the annulus is possible because of the construction of the mating recesses.

What is claimed is:

1. A keyless lockable security device comprising a body member having at last one blind bore therein, said bore having an annular recessed portion intermediate its ends, in cross section the recessed portion has an inclined side surface extending from the bottom of the recess to the edge at one sie in the direction of the open end of the bore and the opposite side surface is concave from the bottom of the recess to the other edge, a male member having at least one limb insertable in its respective blind bore, said limb having an annular recessed portion adjacent a free end thereof, in cross-section the recessed portion of the limb has an inclined side surface extending from the bottom of the recess to one edge and an opposite concave side surface extending from the bottom of the recess to the other edge, an annular member of spring steel, split cross-sectionally in the form of a C-ring, is located in the annular recessed portion of its respective blind bore for engagement in the annular recessed portion of its associated limb when the limb is inserted into its respective blind bore to prevent withdrawal of the limb from the bore.

2. A device as claimed in claim 1 wherein the annular recessed portion in the limb has its one side surface inclined in a direction away from the free end of the limb.

3. A device as claimed in claim 1 wherein the annular recessed portion in the limb has its one side surface inclined in the direction of the free end of the limb.

4. A device as claimed in claim 1 wherein the body member has one longitudinal blind bore and the male member is in the form of a pin having a limb portion and a head portion at one end of the limb the free end of the limb being insertable in the blind bore.

5. A device as claimed in claim 1 wherein the body member has two parallel longitudinal blind bores and the male member is in the form of a shackle of substantially U-shape having two parallel limbs insertable in their respective blind bores.

6. A device as claimed in claim 5 in which aligned transverse slots are formed one in the free end surface of each limb and the body member has at least one transverse bore intersecting the end portions of the longitudinal blind bores and a pin is located in the transverse bore to register in the slots when the limbs are inserted into the blind bores to prevent rotation of either limb relative to the body member.

7. A device as claimed in claim 1 wherein at least 50% of the cross section of the C-ring is located within the confines of the recessed portion of the limb when the limb is inserted in the bore.

8. A device as claimed in claim 1 wherein the concave side surface of the recess in the limb has a radius substantially equal to the radius of the C-ring.

* * * * *

UNITED STATES PATENT AND TRADEMARK OFFICE

CERTIFICATE OF CORRECTION

PATENT NO. : 4,280,726

DATED : July 28, 1981

INVENTOR(S) : John McCoag

It is certified that error appears in the above-identified patent and that said Letters Patent are hereby corrected as shown below:

Column 4, line 3, "sie" should be --side--.

Signed and Sealed this

*Nineteenth* Day of *January 1982*

[SEAL]

*Attest:*

GERALD J. MOSSINGHOFF

*Attesting Officer* — *Commissioner of Patents and Trademarks*